Sept. 17, 1957  K. E. ROBERTSON  2,806,291
LAND MEASURING WHEEL
Filed Sept. 19, 1955
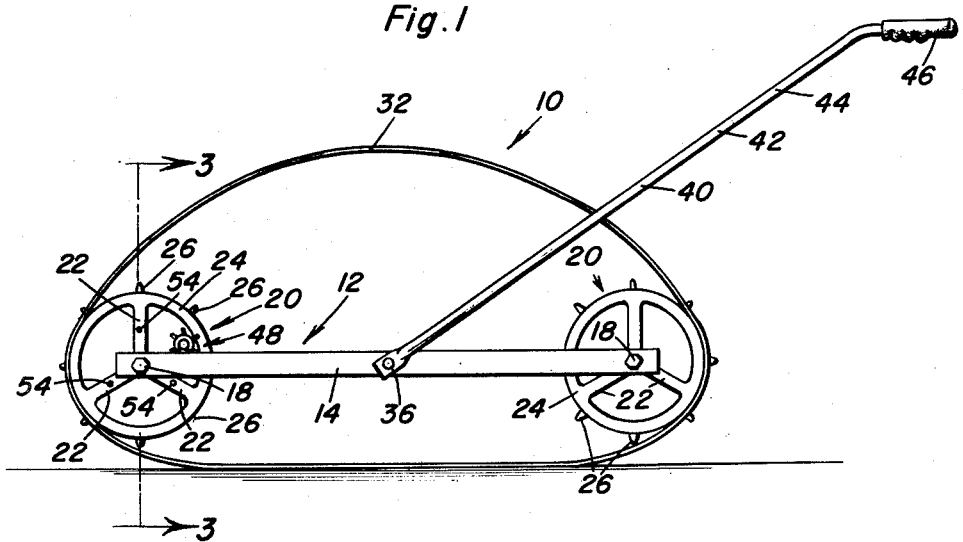
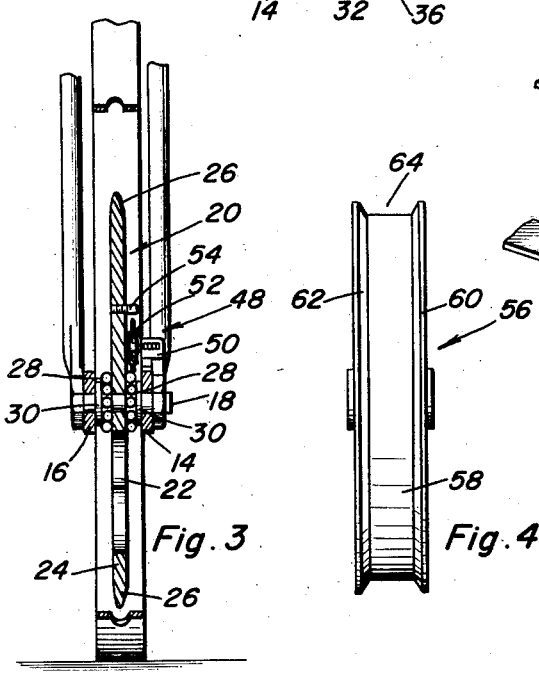
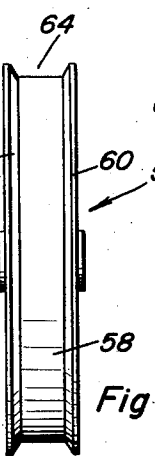
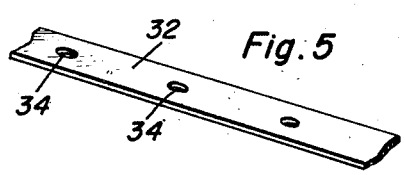
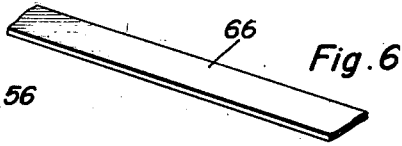
Kenneth E. Robertson
INVENTOR.
BY *Clarence A. O'Brien*
*and Harvey B. Jackson*
Attorneys United States Patent Office 2,806,291
Patented Sept. 17, 1957

2,806,291

LAND MEASURING WHEEL

Kenneth E. Robertson, Lincoln, Nebr.

Application September 19, 1955, Serial No. 534,998

5 Claims. (Cl. 33—141)

This invention relates generally to linear measuring devices and is more particularly concerned with an endless resilient linear measuring tape defining a substantially resilient measuring wheel journalled over a pair of spaced guide wheels rotatably supported on a frame member movable over a ground surface being measured.

A further object of invention in conformance with that set forth above is to provide in a linear measuring device of the character set forth means for recording the number of revolutions or parts of revolutions of the endless resilient linear measuring tape has made over a given ground surface being measured, to apprize the operator of the device the distance having been measured.

A further object of invention in conformance with that set forth above is to provide a linear measuring device of the character set forth which is readily and economically manufactured, easily used and maintained, and highly efficient and readily acceptable for the purpose intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the novel linear measuring device;

Figure 2 is a top plan view;

Figure 3 is an enlarged sectional view taken substantially on line 3—3 of Figure 1;

Figure 4 is an enlarged front elevational view of another embodiment of guide wheel utilized in the device;

Figure 5 is a perspective view of a portion of the flexible measuring tape of the embodiment of Figures 1 through 3; and Figure 6 is a perspective fragmentary view of a portion of resilient tape to be utilized with the guide wheel of Figure 4.

The novel linear measuring device is indicated generally at 10 and includes an elongated frame 12 consisting of a pair of mutually parallel horizontally disposed strip elements 14 and 16 which include suitable horizontally aligned aperture portions through which extend nut and bolt assemblies 18 of any suitable character for rotatably supporting and providing a horizontal axis of rotation for a pair of spaced guide wheels or sprockets 20 which are rotatably supported between the strips 14 and 16.

The sprockets or wheels 20 include a plurality of radial spokes 22 and an annular rim portion 24 having suitably secured thereon equidistantly spaced about the circumference of said sprocket wheel a plurality of peg elements 26 secured in any suitable manner. Journaled on the bolt assembly 18 forming the axle for the wheel sprockets 20 are suitable low friction bearings such as ball bearing races 28 which are interposed between opposite sides of the wheel 20 and a washer element 30 also supported on the bolt assembly 18, said washer element being engageable with the inner surface portion of the strip elements 14 and 16.

An endless linear measuring tape 32 of any suitable material such as resilient steel is journaled over each of the wheels 20, said tape being of sufficient resiliency to support the wheels and frame in a substantially floating or elevated position as seen in Figure 1, the measuring tape 32 being of a known length such as 6 feet, for example, and including a plurality of longitudinally disposed aperture portions extending therethrough and indicated at 34, the pegs 26 being extendable through the aperture portions 34 of the measuring tape inasmuch as said aperture portions are uniformly spaced along said tape.

Intermediately pivoted to the strip members or elements 14 and 16 by means of suitable pivot elements 36 are the opposite legs 38 and 40 of a yoke element 42, said yoke element terminating in a handle portion 44 having a suitable handle 46 secured thereon.

Use of the device is believed readily apparent, the handle portion 46 is moved in a desired direction whereupon the resilient measuring element 32 defines a resilient measuring wheel which will readily move across the terrain or surface being measured in a simple and expeditious manner as the frame 12 is impelled by the handle portion 44 over the terrain or surface. A suitable counting device such as the well known Veeder type indicated generally at 48 may be mounted on a frame as seen in Figures 1 and 3 or in any other suitable position. The counting device includes a housing portion 50 containing conventional indicating gears or wheels, and includes a horizontally disposed rotatable counter sprocket 52 of any conventional character which is engageable by laterally extendable pin elements 54 extending from the spokes 22 of one of the sprocket wheels 20 in an intersecting and engageable relationship with the sprocket wheel 52, see Figure 1.

The sprocket wheels 20 may be so constructed as to have a circumference of such a length that the entire length of the resilient tape is a multiple thereof thereby providing that for a given or complete rotation of a flexible tape will result in a predetermined number of rotations of the sprocket wheel with which the counter 48 cooperates and accordingly a record may be obtained of the number of complete revolutions resulting when the device is expressed across a given linear distance being measured. Additionally the circumference of said wheels may be of a length equal to a particular unit of measure and rotation thereof will be recorded on the counter.

Indicated generally at 56 is a wheel similar to that shown at 20, however, the wheel 56 includes an annular rim 58 of approximately the same width of the measuring tape, and includes at opposite edges thereof radial annular flanges 60 and 62 defining with the rim portion 58 a peripheral guide groove 64 which accommodates therein a flexible measuring tape indicated at 66 frictionally received in said groove 64 between said annular flanges 60. The tape 66 cooperates with the guide wheels 56 in the same manner as the wheels 20 cooperate with the measuring tape 32 and accordingly further description of the operation is believed to be unnecessary. Although the device is illustrated as having a handle 46, for the purpose of manual propulsion of the device across a linear distance being measured, it is believed readily apparent that this device may be secured to a traction vehicle, such as a jeep or tractor whereby the device may be towed across a given distance to be measured being utilized in the same manner as heretofore set forth.

Various positional directional terms such as "front," "rear," etc., are utilized herein to have only a relative connotation to aid in describing the device and are not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A linear measuring device comprising an elongated frame member, a pair of horizontally rotatable guide wheels journalled on opposite end portions of said frame, a resilient endless measuring tape journalled around said wheels and defining a single resilient ground wheel supporting said frame and guide wheels in an elevated position above a surface being measured, said measuring tape including a lower ground engaging portion extending substantially the length of said frame, revolution counting means carried on said frame for indicating the distance travelled by said tape when said frame is impelled over a linear distance being measured, means pivotally connected to an intermediate portion of said frame for moving the tape over said surface being measured.

2. A linear measuring device as set forth in claim 1 wherein said guide wheels comprise sprocket members including radially extending uniformly disposed peg elements extending from the periphery of said sprocket wheels, said tape including a plurality of uniformly spaced longitudinally disposed aperture portions engageable over the peg elements on said sprocket members when said tape is rotated.

3. A linear measuring device as set forth in claim 1 wherein each of said guide wheels includes an annular rim portion having oppositely disposed radially extending annular flanges defining a peripheral guide groove, said endless tape being frictionally received between said annular flanges in said peripheral groove.

4. A linear measuring device as set forth in claim 1 wherein the revolution counting means is mounted on said support frame and includes a rotatable actuating member, one of said guide wheels having a peg on one side thereof operatively engaging said actuating member at predetermined increments of rotation of said measuring tape.

5. A linear measuring device comprising a support frame, wheels spaced on said frame, an endless horizontally rotatable, resilient measuring tape trained around said wheels, said tape defining a ground engaging wheel with an elongated ground engaging surface and being of sufficient resiliency to support the wheels and frame in a substantially elevated position, revolution counting means carried on said frame for indicating the distance traveled by the tape over a linear distance, and means on said frame for moving said tape over the distance being measured.

References Cited in the file of this patent
UNITED STATES PATENTS

| | | |
|---|---|---|
| 2,033,970 | Anderson | Mar. 17, 1936 |
| 2,087,335 | Seeley | July 20, 1937 |
| 2,484,151 | Brownell | Oct. 11, 1949 |